(12) United States Patent
Kim

(10) Patent No.: US 8,975,864 B2
(45) Date of Patent: Mar. 10, 2015

(54) WIRELESS CHARGING SYSTEM FOR AN ELECTRIC VEHICLE, AND CHARGING METHOD FOR SAME

(76) Inventor: Hyunmin Kim, Seoul (KR)

( * ) Notice: Subject to any disclaimer, the term of this patent is extended or adjusted under 35 U.S.C. 154(b) by 503 days.

(21) Appl. No.: 13/502,692

(22) PCT Filed: Oct. 19, 2010

(86) PCT No.: PCT/KR2010/007163
§ 371 (c)(1),
(2), (4) Date: Apr. 18, 2012

(87) PCT Pub. No.: WO2011/049352
PCT Pub. Date: Apr. 28, 2011

(65) Prior Publication Data
US 2012/0206098 A1  Aug. 16, 2012

(30) Foreign Application Priority Data

Oct. 19, 2009  (KR) .................. 10-2009-0099062

(51) Int. Cl.
*H02J 7/00* (2006.01)
*B60L 11/18* (2006.01)
(52) U.S. Cl.
CPC .......... *B60L 11/182* (2013.01); *B60L 11/1831* (2013.01); *B60L 11/185* (2013.01);
(Continued)
(58) Field of Classification Search
USPC .......... 320/108, 109; 180/65.1, 65.21, 65.29; 701/22
See application file for complete search history.

(56) References Cited

U.S. PATENT DOCUMENTS

| | | | |
|---|---|---|---|
| 5,573,090 A | 11/1996 | Ross | |
| 2011/0163542 A1* | 7/2011 | Farkas | ............................. 290/2 |

FOREIGN PATENT DOCUMENTS

| | | |
|---|---|---|
| JP | 08-111908 | 4/1996 |
| JP | 11-273977 | 10/1999 |

(Continued)

OTHER PUBLICATIONS

English Abstract of JP 2001-359203.
English Abstract of JP 08-111908.
English Abstract of JP 11-273977.
English Abstract of JP 2008-054423.
English Abstract of JP 2009-106136.

*Primary Examiner* — Richard V Muralidar
(74) *Attorney, Agent, or Firm* — Hershkovitz & Associates, PLLC; Abe Hershkovitz

(57) ABSTRACT

The present invention relates to a wireless charging system for an electric vehicle and to a charging method for same, in which electric power is wirelessly supplied to the electric vehicle through a plurality of wireless transceiving panels to charge a battery, and only the wireless transceiving panel that is opposite the electric vehicle at an optimum condition in consideration of the type and parked position of the vehicle selectively operates to perform a wireless transceiving operation, thereby maximizing wireless charging efficiency. For this purpose, the present invention provides a wireless charging system for an electric vehicle and a charging method for same, wherein the wireless charging system comprises: a power control device installed in a wireless charging station to control each wireless power-transmitting device; a wireless power-transmitting device and a ground near field wireless communication module, which are installed in a parking area; a plurality of wireless power-transmitting devices installed on the ground of the parking area to select and operate a portion of wireless transmitting panels opposite the vehicle in accordance with electric vehicle charging information; a plurality of wireless receiving panels installed in the lower portion of the electric vehicle such that the panels are movable in the upward and downward directions; and a wireless power receiver, a wireless charging terminal, a near field communication module and a charge controller installed within the electric vehicle, thereby performing optimized wireless charging in accordance with the selection of a driver made via the wireless charging terminal.

16 Claims, 8 Drawing Sheets

(52) U.S. Cl.
CPC .......... *B60L2230/34* (2013.01); *Y02T 10/7005* (2013.01); *Y02T 10/7088* (2013.01); *Y02T 90/122* (2013.01); *Y02T 90/125* (2013.01); *Y02T 90/128* (2013.01); *Y02T 90/14* (2013.01); *Y02T 90/16* (2013.01)
USPC .......................................... 320/109; 320/108

(56) References Cited

FOREIGN PATENT DOCUMENTS

| | | |
|---|---|---|
| JP | 2001-359203 | 12/2001 |
| JP | 2008-054423 | 3/2008 |
| JP | 2009-106136 | 5/2009 |

\* cited by examiner

WIRELESS CHARGING SYSTEM FOR AN ELECTRIC VEHICLE, AND CHARGING METHOD FOR SAME

TECHNICAL FIELD

The present invention relates to a wireless charging system for electric vehicles and a charging method for the same, and more particularly, to a wireless charging system for electric vehicles, which includes a plurality of wireless transmitting panel devices installed on the ground of a parking area, a wireless power transmitting device for controlling the wireless transmitting panel devices, and a short-distance wireless communication module for automatically transmitting information of a vehicle to the wireless power transmitting device when the electric vehicle stops in the parking area, such that a plurality of wireless transmitting panels fit to a kind of the corresponding vehicle are lifted up to get ready for wireless transmission, and when a driver selects a plurality of wireless receiving panels opposed to the ready wireless transmitting panels in a good state by manipulating a wireless charging terminal mounted in the vehicle, the selected wireless transmitting panels and receiving panels are opposed and matched with each other in the optimum state, whereby the wireless charging system can wirelessly charge the electric vehicle within a short period of time.

BACKGROUND ART

Wireless charging is a method of running an electric current through electromagnetic induction to thereby charge up a battery, and for this, a magnetic field generated in a first coil of a charging panel is induced to a second coil connected to the battery to thereby supply the electric current. Such a wireless charging is usefully applied to portable communication apparatuses, electric vehicles, and so on, which require charging of mass storage batteries, has little danger of an electrical short because contact points are not exposed, and can prevent a bad connection of a wire connector type.

A short-distance electromagnetic induction charging method is to transmit electric power converted into electromagnetism between a wireless transmitting panel of a power supply and a wireless receiving panel of a target apparatus to be charged. The shorter a distance between the wireless transmitting panel and the wireless receiving panel, the more an electric energy is concentrated, so that electricity of high efficiency can be transmitted to the target apparatus to be charged in safety. Such technology has been used in various apparatuses for more than 100 years, and can charge batteries as fast as and as safe as the wire charging method according to using methods. Moreover, the technology does not cause confusion with other apparatuses around the target apparatus due to the short-distance electromagnetic induction, is easy to use because of the wireless charging method, is environmental-friendly by minimizing waste of energy, and enables manufacturing of reliable products, which are strong to dust and moisture.

In the meantime, recently, wireless electricity transmission technology has been improved to the level to transmit electricity to electronic products, which are about 30 cm apart to the maximum, and if the transmission distance is expanded to 10 meters in the future, it is expected that the applicable fields is widened to Televisions, home appliances, automobiles, robots, and so on. Wireless power transmission is a power transmitting method of a new concept to transmit energy by converting an electric energy into microwaves, which is favorable to wireless transmission, has the principle of radio wave transmission to send the electric energy through a space without electric wires. Furthermore, the wireless power transmission is not the concept of transmit signals used in the wireless communication systems, such as radios, wireless telephones, and so on, but the concept of transmit electric energy. In other words, the general wireless communication is to send signals with carrier signals, but the wireless power transmission is to send only carrier waves.

Recently, with the introduction of electric vehicles, an attention to construction of the charging infrastructure is increasing. Charging methods of various kinds, such as replacement of batteries, high-speed charging devices, wireless charging devices, and others including the method of charging electric vehicles using chargers for home use, have been disclosed, and new business models for charging business are also appearing now. Electric vehicles and charging stations which are in trial run start to attract people's attention in Europe, and in Japan, automobile manufacturers and electric power companies lead a trial run of electric vehicles and charging stations.

Because it is expected that electric vehicles will become popular in the future, safe and high-speed charging methods to reduce a charging period of time and increase convenience are required, and hence, non-contact wireless charging methods of various types to solve inconvenience in wire charging methods that a plug is put in a socket have been proposed.

The general short-distance wireless charging method has an advantage in that it is safe because a plug is not directed put a socket, but has a problem in that its transmission efficiency is remarkably reduced when the corresponding electromagnetic induction panels are spaced too far apart. Accordingly, in order to charge a high-capacity battery loaded in an electric vehicle, it is necessary to innovatively improve the wireless charging devices, which are low in transmission efficiency and require a lot of time to charge the battery.

DISCLOSURE OF THE INVENTION

Accordingly, the present invention has been made in an effort to solve the above-mentioned problems occurring in the prior arts, and it is an object of the present invention to provide a wireless charging system for electric vehicles, which includes: a power control device installed in a wireless charging station to control each of wireless power transmitting devices; a ground short-distance wireless communication module, which is installed in each parking area; a plurality of the wireless power transmitting devices installed on the ground of each parking area to select and operate some corresponding wireless transmitting panels in accordance with charging information of an electric vehicle; a plurality of wireless receiving panels installed on the lower part of the electric vehicle in such a manner as to move vertically; and a wireless power receiver, a wireless charging terminal, a short-distance wireless communication module and a charging controller installed within the electric vehicle, thereby performing optimized wireless charging by operating only the wireless transmitting panel and the wireless receiving panel which are fit for wireless power transmission and reception according to a driver's selection through the wireless charging terminal disposed on a driver's seat.

To achieve the above objects, the present invention provides a wireless charging system for electric vehicles including: a power control device mounted in a wireless charging station for controlling each of wireless power transmitting devices; at least one wireless power transmitting device connected to the power control device and mounted in a parking area; a ground short-distance wireless communication module connected to the wireless power transmitting device and mounted in the parking area; a plurality of wireless transmitting panel devices installed on the ground of the parking area, each of the wireless transmitting panel devices having a wireless charging panel and being operated in such a fashion that only the wireless transmitting panel device selected according to kinds of the corresponding vehicle based on charging information of the electric vehicle received through short-distance wireless communication on the ground is operated by the wireless power transmitting device; a plurality of wireless receiving panel devices mounted on the lower part of the electric vehicle, each of the wireless receiving panel devices having a wireless receiving panel; a wireless power receiver mounted in the electric vehicle for controlling the wireless receiving panel devices; a wireless charging terminal connected to the wireless power receiver and mounted on a driver's seat of the electric vehicle, the wireless charging terminal allowing the driver to select the wireless receiving panel device suitable for wireless charging out of the plural wireless receiving panel devices and to input an electronic payment; a car short-distance wireless communication module mounted in the electric vehicle and connected to the wireless charging terminal; and a charging controller connected to the wireless power receiver for controlling that electric power received from the wireless receiving panel device is charged to a battery of the electric vehicle.

In another aspect, the present invention provides a charging method of a wireless charging system for electric vehicle including the steps of: generating information of proximity sensors from the tire stopping device when an electric vehicle stops at the parking area; operating the wireless power transmitting device and the ground short-distance wireless communication module based on the information of the proximity sensors; operating the car short-distance wireless communication module through wireless communication with the ground short-distance wireless communication module and wirelessly transmitting charging information of the electric vehicle to the wireless power transmitting device and the wireless charging station; operating the wireless charging terminal disposed on the driver's seat through the car short-distance wireless communication module; selecting and vertically ascending the panel suitable for wireless power transmission out of the plural wireless transmitting panels connected to the wireless power transmitting device according to the charging information of the electric vehicle; operating the wireless power receiving device of the electric vehicle by the operation of the wireless charging terminal; vertically lowering the panel corresponding to the wireless transmitting panel, which is vertically ascended, out of the wireless receiving panels mounted on the lower part of the electric vehicle according to the control of the wireless power receiving device; recognizing the proximity sensors and the electronic tags disposed on each panel when the wireless transmitting panel and the wireless receiving panel are lifted up; matching impedances or microwave frequencies of the electromagnetic coils of the wireless transmitting panel and the wireless receiving panel to achieve optimized wireless transmission and reception by transmitting communication information of the proximity sensors and the electronic tags to the wireless power transmitting device and the wireless power receiving device; displaying the charging menus on the wireless charging terminal; selecting the charging menu on the wireless charging terminal by the driver's manipulation; transmitting the driver's selection information to the wireless charging station through communication between the car short-distance wireless communication module and the ground short-distance wireless communication module; based on the driver's selection information, respectively supplying electric power to the plural wireless transmitting panels selected by a control of the wireless power transmitting device connected to the wireless charging station; based on the driver's section information, receiving wireless electric power to the corresponding wireless receiving panels selected by a control of the wireless power receiver; combining all electric power wirelessly received through the plural wireless receiving panels through the wireless power receiver and charging the battery of the electric vehicle through the charging controller; displaying information on completion of charging on the wireless charging terminal when charging is finished; allowing the driver to do electronic payment of charging fees through the wireless charging terminal; and initializing the wireless charging system when the electronic payment is finished.

In a further aspect, the present invention provides a charging method of a wireless charging system for electric vehicle comprising the steps of: Generating information of proximity sensors from the temporarily tire-stopping device when an electric vehicle stops at the parking area; operating the wireless power transmitting device and the ground short-distance wireless communication module based on the information of the proximity sensors; operating the car short-distance wireless communication module through wireless communication with the ground short-distance wireless communication module and wirelessly transmitting charging information of the electric vehicle to the wireless power transmitting device and the wireless charging station; operating the wireless charging terminal disposed on the driver's seat through the car short-distance wireless communication module; based on the charging information of the electric vehicle, moving a panel carrier, which is suitable for wireless power transmission and reception, out of a plurality of panel carriers in all directions to the plural wireless receiving panels mounted on the lower end of the electric vehicle according to a control of the wireless power transmitting device; vertically lifting each of the wireless transmitting panels mounted on the plural panel carriers selected and moved; operating the wireless power receiving device of the electric vehicle by the operation of the wireless charging terminal; vertically lowering the panel corresponding to the wireless transmitting panel, which is vertically ascended, out of the wireless receiving panels mounted on the lower part of the electric vehicle according to the control of the wireless power receiving device; recognizing the proximity sensors and the electronic tags disposed on each panel when the wireless transmitting panel and the wireless receiving panel are lifted up; matching impedances or microwave frequencies of the electromagnetic coils of the wireless transmitting panel and the wireless receiving panel to achieve optimized wireless transmission and reception by transmitting communication information of the proximity sensors and the electronic tags to the wireless power transmitting device and the wireless power receiving device; displaying the charging menus on the wireless charging terminal; selecting the charging menu on the wireless charging terminal by the driver's manipulation; transmitting the driver's selection information to the wireless charging station through communication between the car short-distance wireless communication module and the ground short-distance wireless communication module; based on the driver's selection information, respectively supplying electric power to the plural wireless transmitting panels selected by a control of the wireless power transmitting device connected to the wireless charging station; based on the driver's section information, receiving wireless electric power to the corresponding wireless receiving panels selected by a control of the wireless power receiver; combining all electric power wirelessly received through the plural wireless receiving panels through the wireless power receiver and charging the battery of the electric vehicle through the charging controller; displaying information on completion of charging on the wireless charging terminal when charging is finished; allowing the driver to do electronic payment of charging fees through the wireless charging terminal; and initializing the wireless charging system when the electronic payment is finished.

In the case that the wireless charging system according to the present invention is installed in general parking area, the wireless charging system is safe because there is no danger of an electric shock owing to the non-contact wireless method, and can contribute to spread of electric vehicles because it can charge electric vehicles at high speed.

Moreover, because the driver selectively operates only the wireless receiving panels, which are suitable for receiving electric power, out of the plural wireless receiving panels by manipulating the wireless charging terminal disposed on the driver's seat to carry out wireless charging, the wireless charging system according to the present invention can minimize a loss of electric power without any error between the opposed wireless transmitting and receiving panels, charge the electric vehicles in high efficiency, rapidly and conveniently charge the batteries of the electric vehicles within a short period of time because high power is transmitted and received wirelessly by the plural wireless transmitting panels and the plural wireless receiving panels.

Furthermore, because only the wireless transmitting panels and the wireless receiving panels opposed to each other at the optimally short distance are selected for wireless power transmission and reception even though the positions of the wireless receiving panels mounted on the lower part of the vehicle are varied according to manufacturers and kinds of electric vehicles, the wireless charging system according to the present invention can effectively carry out wireless charging without regard to kinds of the electric vehicles and solve the problem of charging facilities having charging devices that must be accurately set, the problem of long waiting time for charging and the problem of charging spaces for special facilities, so that the wireless charging system can be economically operated.

MODES FOR CARRYING OUT THE PREFERRED EMBODIMENTS

Figure 1:
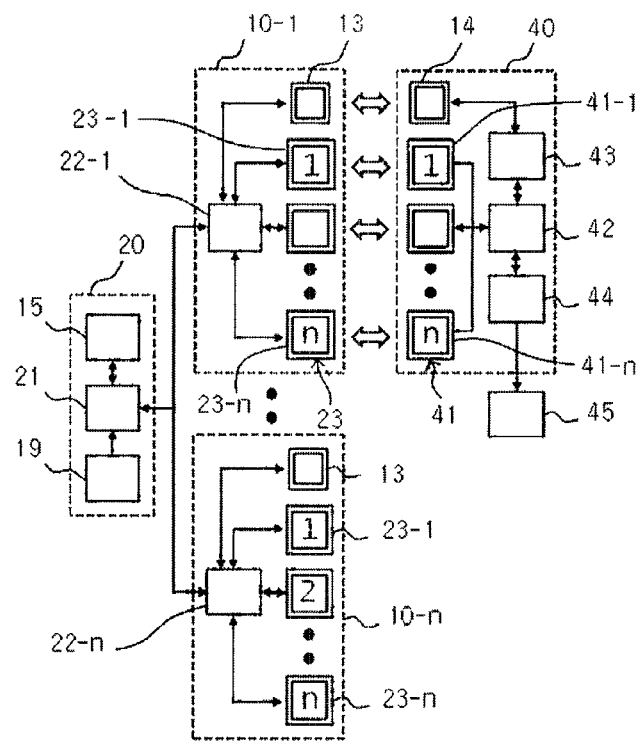
FIG. 1 is a block diagram of a wireless charging system according to a preferred embodiment of the present invention.

FIG. 1 is a block diagram of a wireless charging system according to a preferred embodiment of the present invention.

As shown in FIG. 1, the wireless charging system for electric vehicles according to a preferred embodiment of the present invention includes a ground wireless charging system and a car wireless charging system. The ground wireless charging system is constructed in such a fashion that a common power line 19 and a broad wireless communication network 15 are connected to a power control device 21 of a wireless charging station 20 and a plurality of wireless transmitting panel devices 23 and 23-1 to 23-$n$ mounted on the ground of a parking area and a ground short-distance wireless communication module 13 are connected to a plurality of wireless power transmitting devices 22, 22-1 to 22-$n$ connected with the power control device 21 in parking areas 10 and 10-1 to 10-$n$, and in response, the car wireless charging system includes a plurality of wireless receiving panel devices 41 and 41-1 to 41-$n$ installed on a lower part of the electric vehicle, a wireless charging terminal 43 installed on a driver's seat and a wireless power receiving device 40, which is installed inside the vehicle and has a charging controller 44, a wireless power receiver 42 and a short-distance wireless communication module 14.

Figure 13:
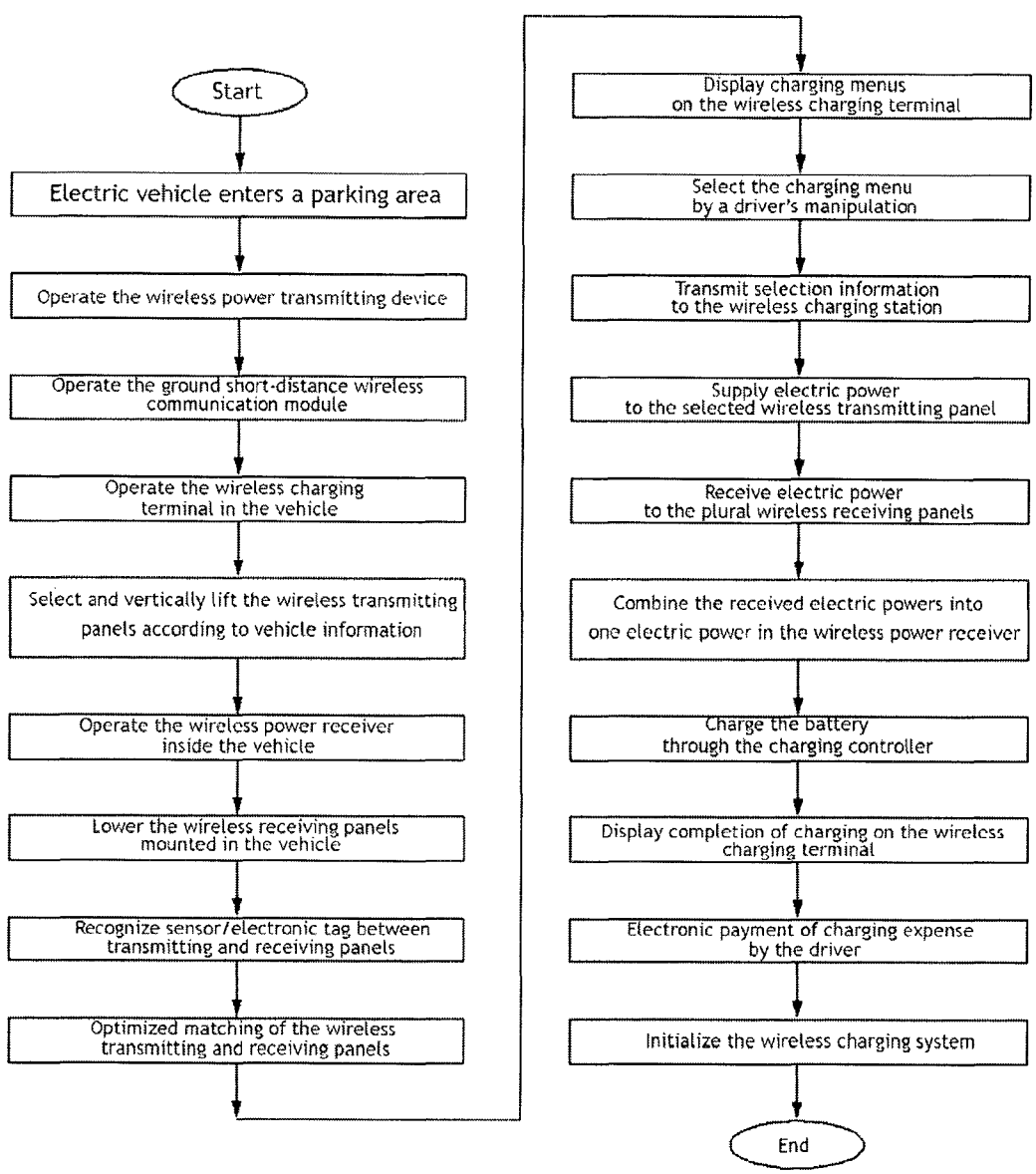
FIG. 13 is a flow chart showing a wireless charging method according to the first preferred embodiment of the present invention.
Figure 14:
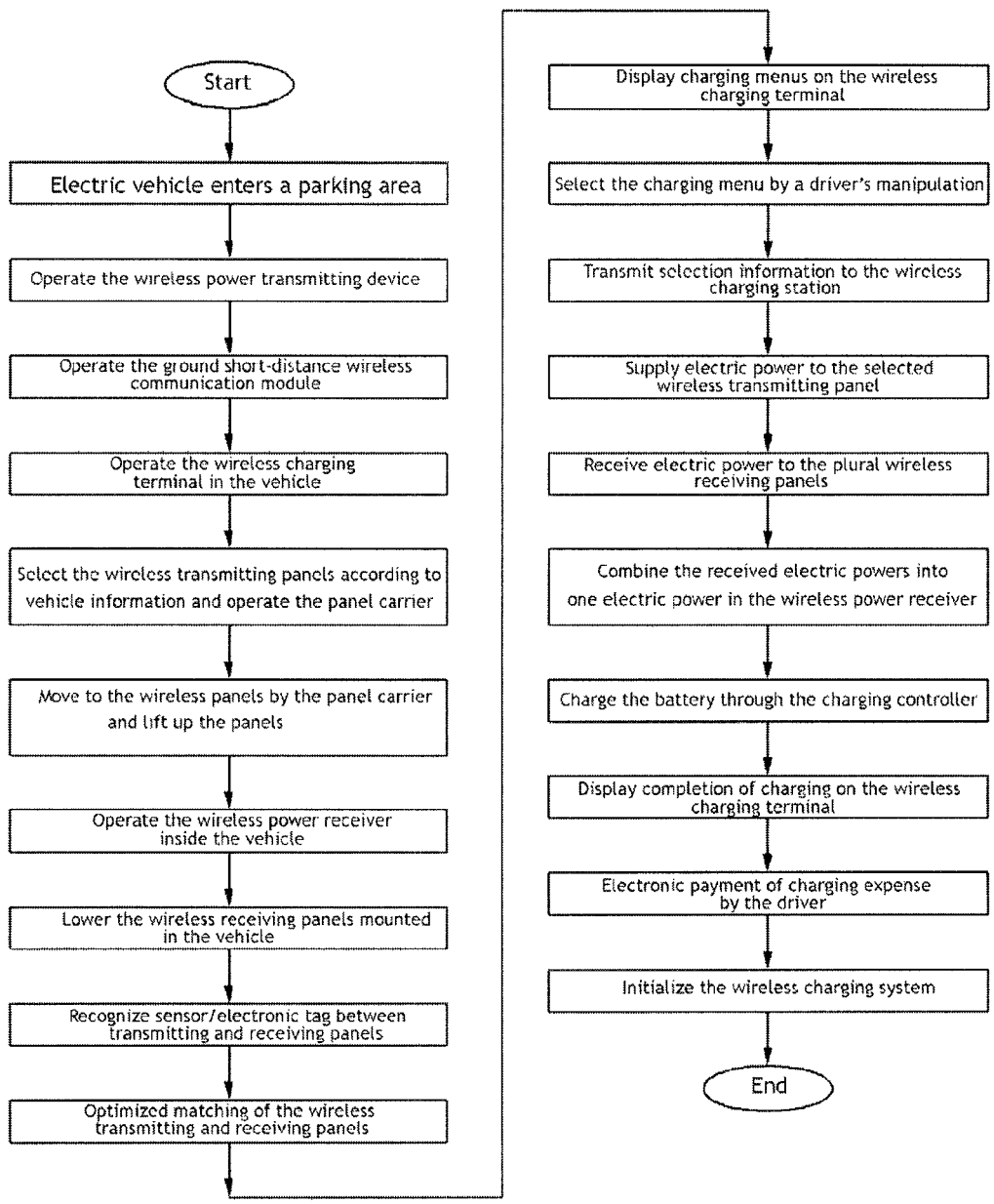
FIG. 14 is a flow chart showing a wireless charging method according to the second preferred embodiment of the present invention.

It is preferable that a plurality of the ground wireless charging systems according to the present invention are installed at the parking areas 10-1 to 10-$n$ in a parking lot, which has lots of parking areas and are integratedly operated according to wireless charging methods shown in FIGS. 13 and 14. In the case that the plural wireless charging systems are integratedly operated, as shown in FIG. 1, it is effective to connect the wireless power transmitting devices 22 and 22-1 to 22-$n$, each of which has the plural wireless transmitting panel devices 23 and 23-1 to 23-$n$, to the power controller 21 of the wireless charging station 20 in parallel by each parking area.

Figure 5:
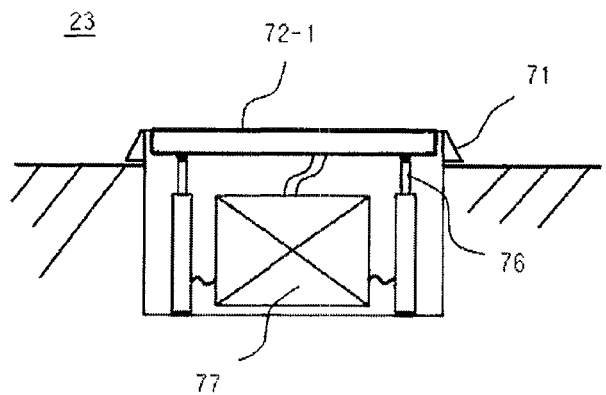
FIG. 5 is a view showing a state where the wireless transmitting panel device of FIG. 2 is buried and installed in a parking area.
Figure 6:
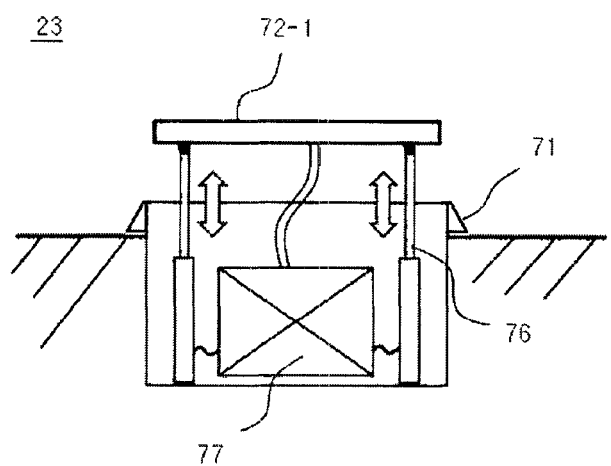
FIG. 6 is a view showing a state where wireless receiving panels of the wireless transmitting panel device of FIG. 2 rise up.

In the case that the ground wireless charging system is constructed utilizing the existing parking area, as shown in FIGS. 5 and 6, it is preferable that only the upper end portion of the wireless transmitting panel device 23, which has a predetermined inclined side so that a panel frame exposed to the ground surface of the parking area is not caught to a tire, and the ground short-distance wireless communication module 13 have a waterproof finish and are exposed to the ground surface, and subsidiary devices, such as a lifting device for elevating the wireless transmitting panels or a panel controller, are buried under the ground of the parking area, so that not only the electric vehicles but also general vehicles can easily park in the corresponding parking area.

In the preferred embodiment of the present invention, a wireless transmitting panel 72-1 of the wireless transmitting panel device 23 and a wireless receiving panel 72-2 of the wireless receiving panel device 41 respectively have electromagnetic induction coils for short-distance wireless charging. Moreover, in another preferred embodiment of the wireless power transmission, the wireless transmitting and receiving panels of the wireless transmitting panel device 23 and the wireless receiving panel device 41 respectively have microwave antennas embedded therein instead of the electromagnetic induction coils so as to convert electric power into microwaves and transmit the microwaves to the wireless power receiver 42 of the vehicle.

Figure 4:
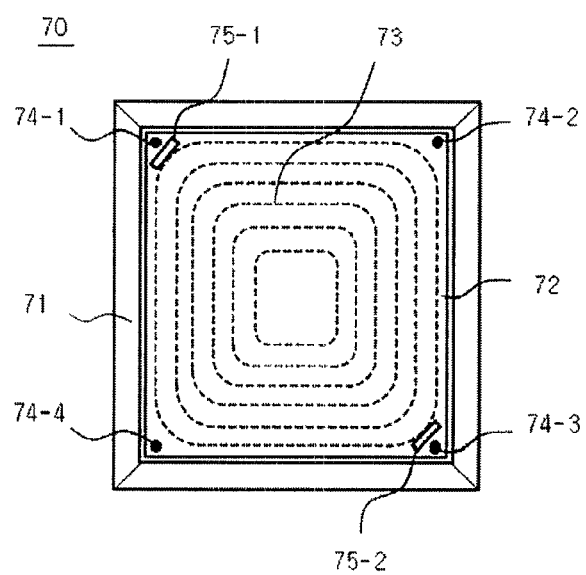
FIG. 4 is a plan view showing a structure of the wireless transmitting and receiving panels.

As shown in FIG. 4, the electromagnetic induction coils for short-distance wireless charging, which are mounted in the wireless transmitting panel 72-1 of the wireless transmitting panel device 23 and the wireless receiving panel 72-2 of the wireless receiving panel device 41 in a plate type, are constructed of a panel type of induction coils, which have a great number of interlinkage of magnetic flux lines per hour, so as to transmit and receive a high-power induced electromotive force. In order to prevent a loss of electric power due to a distance and an error between the opposed transmitting and receiving panels during wireless power transmission, the wireless transmitting panel 23 and the wireless receiving panel 41 respectively have variable capacitors mounted on their lower parts, and the wireless power transmitting device 22 and the wireless power receiving device 40 respectively control them into the optimum interface state to thereby communicate with the maximum induction voltages and currents through inductance and resonance of the induction coils. The short-distance wireless transmission technology using the electromagnetic induction coils is the well-known technology, and hence, the detailed description of the structure and operation will be omitted.

Moreover, in order to convert the electric power energy into microwaves and transmit the microwaves to the wireless transmitting and receiving panels of the wireless transmitting panel device 23 and the wireless receiving panel device 41 instead of the electromagnetic induction coils, the wireless transmitting panel of the wireless transmitting panel device 23 serves as an antenna for transmitting microwaves and the wireless receiving panel of the wireless receiving panel device 41 serves as an antenna for receiving microwaves, and the wireless transmitting panel device 23 has a microwave generator for converting the transmitted electric power into microwaves, and hence, the wireless receiving panel receives the microwaves through the wireless transmitting panel. The wireless transmission technology using the microwaves is also well-known, and hence, the detailed description of the structure and operation will be omitted.

The structure of the wireless charging system for electric vehicles according to the present invention will be described in detail. The wireless charging system for electric vehicles includes: a power controller 21 connected to a broad wireless communication network 15 and a common power line 19; a short-distance wireless communication module 13 connected to the power controller 21 and installed at a parking area 10; a wireless power transmitting device 22 connected to the power controller 21 and installed at the parking area 10, the wireless power transmitting device 22 having a plurality of wireless transmitting panel devices 23 mounted on the floor of the parking area side by side; a wireless power receiver 42 mounted on an electric vehicle 30, the wireless power receiver 42 having a plurality of wireless receiving panel devices 41 mounted on the lower part of the electric vehicle; a wireless charging terminal 43 connected to the wireless power receiver 42 and mounted on the driver's seat of the electric vehicle; a short-distance wireless communication module 14 connected to the wireless charging terminal 43 and mounted on the lower part of the electric vehicle; and a charging controller 44 connected to the wireless power receiver 42 for controlling charging of a batter for the electric vehicle.

Additionally, the following various functions may be added to the wireless charging system according to the present invention. The detailed contents of matters added to the present invention will be described in detail in the corresponding items based on FIGS. 2 to 12.

The short-distance wireless communication modules 13 and 14, which have the basic wireless communication function, respectively have at least one proximity sensor for sensing approach of the electric vehicle and whether or not the electric vehicle stops at a correct position and at least one electronic RFID (Radio Frequency Identification) tag, which stores charging information of the electric vehicle, so as to wirelessly communicate parking information and charging information between the ground wireless power transmitting device 22 and the car wireless power receiving device 40 and utilize the information as information for operation of the wireless charging system when the electric vehicle 30 enters the parking area 10 to charge its battery.

The charging information of the electric vehicle is automatically communicated between the ground wireless charging system and the car wireless charging system through the short-distance wireless communication modules 13 and 14 when the electric vehicle enters the parking area, and includes various system information related with charging, such as the model of the electric vehicle, wireless charging specification of the wireless power receiving device, information of attached position of the wireless receiving panels, charging conditions, the residual quantity of the battery of the electric vehicle, and others.

Furthermore, a temporarily tire-stopping device 11 for stopping the vehicle at the position of a parking indication line 12 is mounted at the parking area 10 and has a pressure sensor. The temporarily tire-stopping device 11 is connected to the wireless power transmitting device 22, so that the wireless power transmitting device 22 is automatically operated by information of the pressure sensor transferred when the electric vehicle 30 stops at the parking area 10. Besides the above method for checking the stop of the electric vehicle utilizing the pressure sensor, it is preferable to use an optical sensor, an approach sensor, or a non-contact sensor in order to check whether or not the electric vehicle stops at the correct position through a non-contact method.

Figure 7:
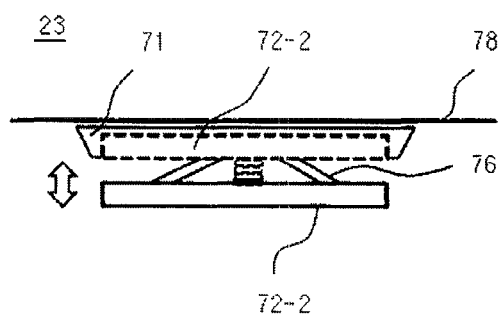
FIG. 7 is a view showing a state where the wireless receiving panels of FIG. 3 lower.

Additionally, as shown in FIGS. 4 to 6, the wireless transmitting panel device 23 includes a panel receiving frame 71, a wireless transmitting panel 72-1 having an electromagnetic induction coil, and a lifting device 76 for ascending the wireless transmitting panel 72-1 in multiple stages. As shown in FIG. 7, the wireless receiving panel device 41 includes a panel receiving frame 71, a wireless receiving panel 72-2 having an electromagnetic induction coil, and a lifting device 76 for descending the wireless receiving panel 72-2. Accordingly, the wireless power transmitting system according to the present invention can obtain a high efficiency of an induced electromotive force for charging without any loss of electric power while keeping the minimized interval between the wireless transmitting panel and the wireless receiving panel opposed to each other by a control of the wireless power transmitting device 22 and the wireless power receiving device 40.

Figure 8:
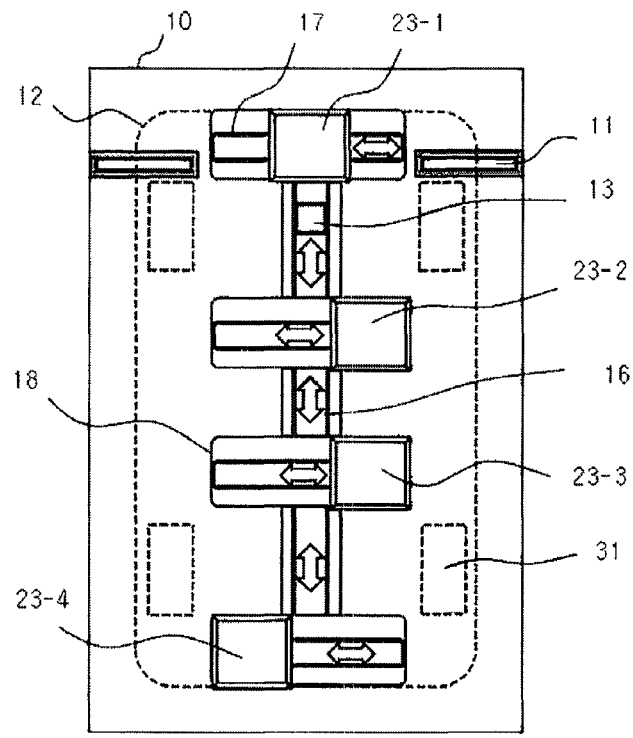
FIG. 8 is a view showing a state where a plurality of the wireless transmitting panels according to the second preferred embodiment are moved by a panel carrier.
Figure 9:
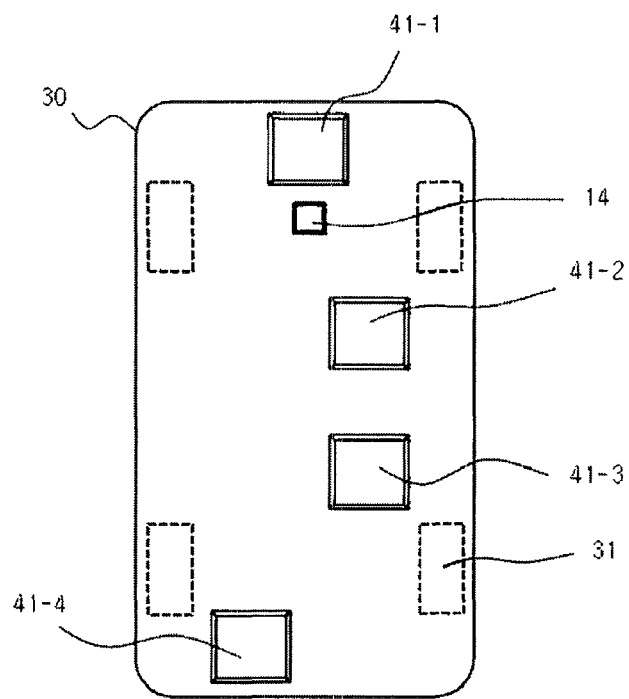
FIG. 9 is a view showing a state where a plurality of the wireless receiving panels mounted on the lower part of the electric vehicle according to the second preferred embodiment are aligned.
Figure 10:
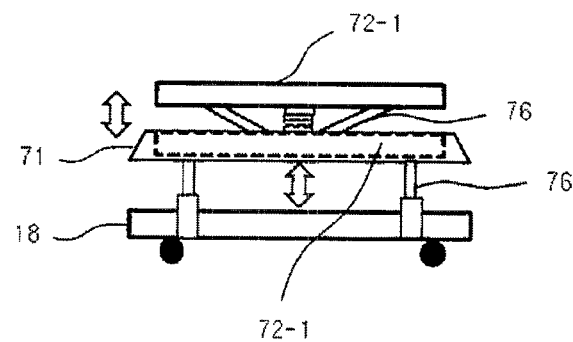
FIG. 10 is a view showing a state where the wireless transmitting panels of FIG. 8 rise to the two-stage height.

Moreover, according to the charging information of the electric vehicle 30, which is automatically communicated by the ground short-distance wireless communication module 13 and the car short-distance wireless communication module 14, as shown in FIGS. 8 to 10, the panel carrier 18 having the wireless transmitting panel device 23 thereon moves laterally, vertically or back and forth along movable tracks 16 and 17 within the parking area 10 according to the position of the plural wireless receiving panel device 41 to thereby achieve the short-distance wireless power transmitting or reception. The panel carrier 18 also has a lifting device 76 for ascending the wireless transmitting panel device 23 so as to wirelessly transmit a high power between the wireless transmitting and receiving panels without any loss of electric power by minimizing an interval between the wireless transmitting panel and the wireless receiving panel, which are opposed to each other, by a control of the wireless power transmitting device.

Furthermore, the wireless transmitting panel device 23 and the wireless receiving panel device 41 respectively have an impedance matching function to optimize electromagnetic induction to automatically correct the distance between the opposed wireless transmitting and receiving panels and an error due to a deviation between the opposed wireless transmitting and receiving panels, whereby the wireless transmitting panel device 23 and the wireless receiving panel device 41 enable the electric power to be transmitted at high speed and in a high efficiency rate without any loss of electric power. Such a matching function of the wireless transmitting and receiving panels automatically matches microwave frequencies to optimize wireless charging in the case that wireless electric power is transmitted or received not by the electromagnetic induction method but by microwaves.

Furthermore, as shown in FIG. 4, each of the wireless transmitting panels of the wireless transmitting panel device 23 and each of the wireless receiving panels of the wireless receiving panel device 41 respectively have at least one proximity sensor for sensing an approach distance between the panels and at least one electronic RFID (Radio Frequency Identification) tag storing ID and charging conditions of the wireless panels. When the two wireless panels are opposed to each other at a short distance, the proximity sensor is operated and the electronic tag receives information of the wireless transmitting and receiving panels, which contains ID and charging conditions, and the information is transferred to the wireless charging terminal 43 and the wireless charging station 20, so that the ground wireless charging system and the car wireless charging system can effectively carry out the wireless charging procedures based on the information.

Figure 12:
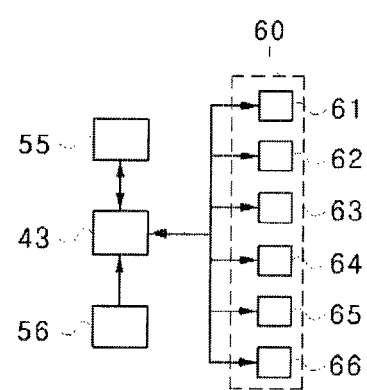
FIG. 12 is a block diagram showing a structure of charging menus displayed on a screen of a wireless charging terminal.

Additionally, as shown in FIG. 12, the wireless charging terminal 43 includes a broad wireless communication network module 55 and a GPS receiving module 56 embedded therein. So, a navigation function and information of wireless charging stations in a region where the electric vehicle runs are shown on a position information indicator 66 of a wireless charging terminal screen 60 in real time, and charging menus, such as a battery charging condition indicator 61, a panel matching information indicator 62 indicating a ratio of matching information of at least one wireless receiving panel device capable of wireless charging, a charging process indicator 64, and an electronic payment menu indicator 61, are shown on the screen as touch screen menus, so that the driver can easily and effectively carry out wireless charging procedures by manipulating the charging menus while watching the wireless charging terminal 43 on the driver's seat.

Figure 11:
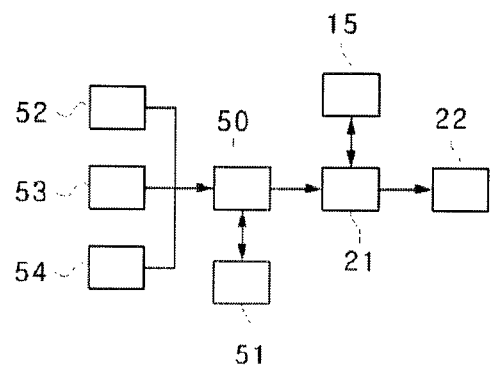
FIG. 11 is a block diagram showing the structure of a wireless charging station operated using compound electricity.

In addition, as shown in FIG. 11, in the case that the ground wireless charging system is installed in a region where it is difficult to connect common electric wires, the ground wireless charging system includes: a compound electricity charging controller 50 and a power storing battery device 51, which are connected to the power control device 21; and independent power plants, such as a solar-light power generator 52, a wind power generator 53 and a fuel cell device 54, installed separately or together. Electric power generated in the independent power plant is supplied to the compound electricity charging controller 50 and charged to the power storing battery device 51, and then, is wirelessly charged to an electric vehicle through the charging method shown in FIG. 13 when the electric vehicle enters the parking area for charging. Accordingly the wireless charging system according to the present invention can construct the charging infrastructure wherever in the world without dead zones of charging, such as deserts or backwoods where it is difficult to carry out wireless charging.

Particularly, the wireless charging system for electric vehicles according to the present invention enables unmanned operation through a remote control by the broad wireless communication network. Because the wireless charging system can automatically carry out wireless charging to the electric vehicle, which enters the wireless charging station, according to the guidance of the wireless charging station position of the wireless charging terminal disposed on the driver's seat after generating electric power for charging through green energy sources, such as solar light, wind power, fuel cells, and storing the power to the battery device, the wireless charging system is easy in installation of the wireless charging station, is safer than the wire charging method, and can be operated economically.

Hereinafter, referring to the drawings showing essential parts of the wireless charging system, the present invention will be described in more detail as follows.

Figure 2:
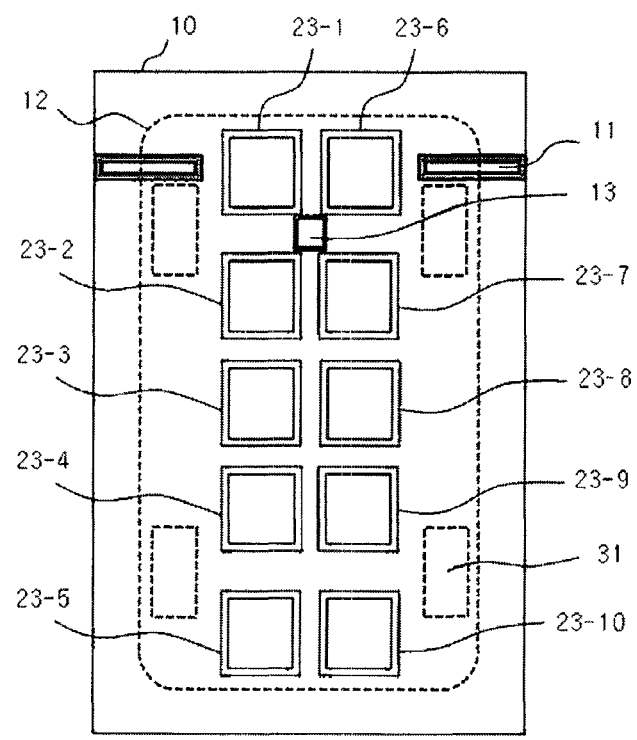
FIG. 2 is an alignment diagram of a plurality of wireless transmitting panels installed in a general parking area according to a first preferred embodiment of the present invention.
Figure 3:
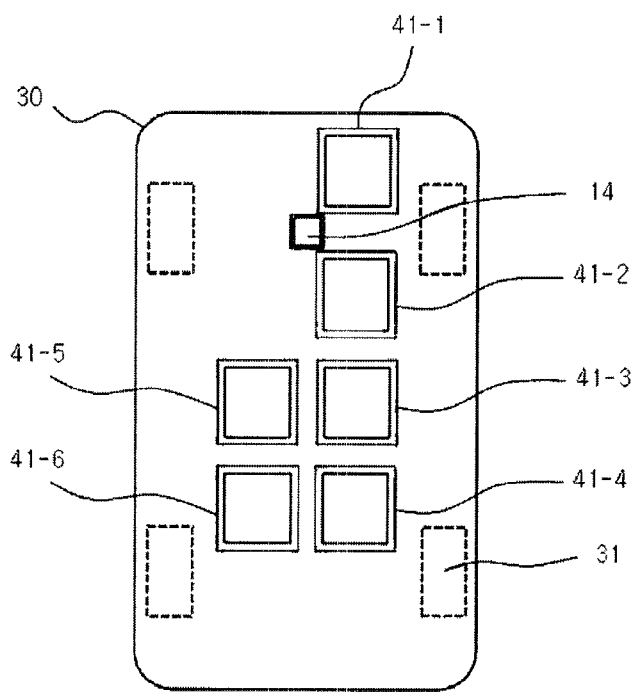
FIG. 3 is an alignment diagram of a plurality of wireless receiving panels installed in a lower part of an electric vehicle according to the first preferred embodiment of the present invention.

FIG. 2 is an alignment diagram of a plurality of the wireless transmitting panels installed in a general parking area according to a first preferred embodiment of the present invention, and FIG. 3 is an alignment diagram of a plurality of the wireless receiving panels installed on the lower part of the electric vehicle according to the first preferred embodiment of the present invention.

Based on FIG. 1 showing the wireless charging system for electric vehicles according to the first preferred embodiment of the present invention, as shown in FIG. 2, the ground wireless charging system includes a temporarily tire-stopping device 11 installed in a parking area 10 and a wireless power transmitting device 22 having a ground short-distance wireless communication module 13 and a plurality of wireless transmitting panel devices 23-1 to 23-10. In response to the above, as shown in FIG. 3, the car wireless charging system includes a wireless power receiving device 40 having a short-distance wireless communication module 14 and a plurality of wireless receiving panel devices 41-1 to 41-6, a wireless charging terminal 43, a charging controller 44, and a battery 45, which are mounted in the electric vehicle 30.

Out of the parts shown in the block diagram of the wireless charging system for electric vehicles of FIG. 1, parts, which are not illustrated in FIG. 2 but described in the followings, are hidden under the ground in the parking area or by a parking strip or located at remote places, and parts, which are not illustrated in FIG. 3, are installed inside the electric vehicle and not exposed out, and hence, the parts are not illustrated in FIGS. 2 and 3.

Referring to FIGS. 2 and 3, the embodiment of the wireless charging system for electric vehicles will be described in detail. When the electric vehicle 30 having six fixed wireless receiving panel devices 41-1 to 41-6 mounted on the lower part of the vehicle enters the parking area 10 and stops the front wheels by the temporarily tire-stopping device 11, the pressure sensor or the non-contact sensor is operated, the ground short-distance wireless communication module 13 and the wireless power transmitting device 22 interworking with the sensor are also operated, so that the ground short-distance wireless communication module 13 communicates with the short-distance wireless communication module 14 mounted in the electric vehicle 30 and charging information of the electric vehicle is transferred to the wireless charging system.

According to the charging information of the electric vehicle, by a control of the wireless power transmitting device 22 recognizing the position information of the wireless receiving panel devices 41-1 to 41-6 mounted on the lower part of the corresponding electric vehicle, wireless transmitting panels of six wireless transmitting panel devices 23-3, 23-4, 23-6, 23-7, 23-8 and 23-9 opposed to the wireless receiving panel devices 41-1 to 41-6 out of the ten wireless transmitting panel devices 23-1 to 23-10 vertically rise to a distance set based on the charging information for short-distance wireless charging, and at the same time, information on the rise of the ground wireless transmitting panels is transferred to the wireless charging terminal 43 disposed on the driver's seat of the electric vehicle through the car short-distance wireless communication module 14, and then, a ratio of suitability of the opposed state of the selected ground wireless transmitting panels and the car wireless transmitting panels is displayed on the wireless charging terminal 43 in colors or percentage.

Accordingly, when the driver touches the screen to select the wireless receiving panel of a good opposed state while watching the ratio of suitability of the opposed state between the wireless transmitting panels of the wireless transmitting panel devices 23-3, 23-4, 23-6, 23-7, 23-8 and 23-9 and the wireless receiving panels of the wireless receiving panel devices 41-1 to 41-6 on the screen of the wireless charging terminal 43 disposed on the driver's seat, the driver's selection information is transferred to the wireless power transmitting device 22 installed at the parking area through the car short-distance wireless communication module 14 and the ground short-distance wireless communication module 13, and then, electric power is supplied only to the wireless transmitting panel device, which is opposed to the selected wireless receiving panel, so that the wireless charging system of the present invention can prevent a loss of power by unused panels and an interference with other using panels, and prevent a loss of power due to an error in the opposed state of the wireless transmitting and receiving panels and effectively carry out wireless charging by transmitting electric power only to the wireless receiving panel, which the driver finally selects.

In a preparing step for wireless power transmission and reception, when the wireless transmitting panels of the ground wireless transmitting panel devices 23-3, 23-4, 23-7, 23-8 and 23-9 and the wireless receiving panels of the car wireless receiving panel devices 41-1 to 41-6 are opposed to each other at a predetermined short distance according to the charging information, as shown in FIG. 4, it is preferable that the proximity sensors 74-1 to 74-4 are mounted at edge portions of the wireless transmitting and receiving panels and information of the sensor detecting an approach distance between the panels is provided to the wireless power transmitting device 22 and the wireless power receiving device 40 to control the rising state of the wireless transmitting and receiving panels into the optimum opposed state to effectively transmit and receive wireless electric power.

Moreover, as shown in FIG. 4, a plurality of electronic tags containing IDs and charging conditions of the wireless power panels are diagonally mounted at the edge portions of the wireless transmitting and receiving panels, and when the wireless transmitting panels of the ground wireless transmitting panel devices 23-3, 23-4, 23-7, 23-8 and 23-9 and the wireless receiving panels of the car wireless receiving panel devices 41-1 to 41-6 are opposed to each other at a predetermined short distance, they exchange the information of the electronic tags stored therein with each other, so that the wireless power transmitting device 22 and the wireless power receiving device 40 utilize the information to judge whether or not the standard of the corresponding wireless receiving panel is fit to the standard of the wireless transmitting panel, whereby the wireless charging system can prevent any error that the wireless transmitting and receiving panels which are not fit to the transmission standard from communicating wireless electric power with each other and enables the wireless power transmitting device 22 and the wireless power receiving device 40 to accurately control the wireless transmitting and receiving panels in the optimum matching state based on the communicated charging conditions.

Furthermore, the information of the proximity sensors and the electronic tags is transferred to the wireless charging terminal 43 disposed on the driver's seat of the electric vehicle, and is utilized as matching information to accurately judge the ratio of the opposed state of the wireless transmitting panels of the ground wireless transmitting panel devices 23-3, 23-4, 23-7, 23-8 and 23-9 and the wireless receiving panels of the car wireless receiving panel devices 41-1 to 41-6, so that the driver can select charging means more effectively and the charging system can carry out wireless charging at high speed.

In the wireless charging system according to the present invention having a plurality of the wireless transmitting and receiving panels to reduce a wireless charging period of time, the reason that the driver selects the wireless receiving panel in the wireless charging step is to prevent a loss of electric power due to an error in the opposed state of the wireless transmitting and receiving panels and to make the driver select the optimum charging condition out of wireless charging conditions proposed by the system after previously recognizing whether or not the wireless receiving panel can carry out wireless charging and an available charging period of time according to the driver's selection of the provided information through the wireless charging terminal in response to various kinds of electric vehicles having the wireless receiving panels with different mounting positions and sizes.

As described above, even though the wireless receiving panel mounted on the lower part of the vehicle is varied in mounted position and size according to kinds and manufacturers of electric vehicles, the wireless charging system according to the present invention can effectively carry out wireless transmission in a state where the loss of electric power is minimized by synthesizing the charging conditions obtained through the charging information, which is obtained through wireless communication between the short-distance wireless communication modules, and the information, which is obtained from the proximity sensors and the electronic tags, and keeping the short distance between the opposed wireless transmitting and receiving panels and controlling the matched state according to the charging conditions, so that the wireless charging system can supply high power to the electric vehicle within a short period of time so as to reduce the charging period of the battery.

The number of the wireless transmitting panel devices 23-1 to 23-10 is ten in FIG. 2 but the number of the wireless receiving panel devices 41-1 to 41-6 is six in FIG. 3, and the reason is to show an example that the ground wireless transmitting panel devices and the car wireless receiving panel devices are located in bad opposite positions. In order to effectively transmit wireless electric power in response to various kinds of vehicles, a plurality of the ground wireless transmitting panel devices 23 are located at the central part of the parking area 10 at predetermined intervals, and a number of the wireless transmitting panel devices 23 can be aligned in a vertical or horizontal direction according to areas and facility conditions of the parking areas and parking strips.

In addition, in the case that the battery of the electric vehicle is not charged, the wireless power transmitting device 22 installed in the parking area 10 is not operated, and hence, there is not loss of power. Also in the case that not the electric vehicle but a general vehicle is in the parking area 10, if the ground short-distance wireless communication module 13 and the car short-distance wireless communication module 14 do not communicate with each other to provide the charging information, the wireless charging system is safe because the wireless power transmitting device 22 is not operated.

FIG. 4 is a plan view showing a structure of the wireless transmitting and receiving panels, FIG. 5 is a view showing a state where the wireless transmitting panel device of FIG. 2 is buried and installed in a parking area, FIG. 6 is a view showing a state where the wireless receiving panels of the wireless transmitting panel device of FIG. 2 rise up, and FIG. 7 is a view showing a state where the wireless receiving panels of FIG. 3 lower.

As shown in FIG. 4, a body 70 of the wireless transmitting panel and a body 70 of the wireless receiving panel respectively include a wireless transmitting panel 72-1 and a wireless receiving panel 72-2, which are disposed in a panel receiving frame 71 having inclined sides to protect the wireless transmitting and receiving panels from the external pressure and respectively have an electromagnetic induction coil 73 or a microwave antenna embedded therein, and a lifting device 76 for elevating the panels 72-1 and 72-2 in multiple stages.

The wireless transmitting and receiving panels 72, 72-1 and 72-2 respectively includes at least one proximity sensor 74-1 to 74-4 for sensing an approach distance between the wireless transmitting and receiving panels and at least one electronic tag 75-1 and 75-2 containing IDs and charging conditions of the wireless panels, which are mounted at edge portions of the wireless transmitting and receiving panels 72, 72-1 and 72-2, such that the proximity sensor is operated and panel information on IDs and charging conditions stored in the electronic tag is provided to the wireless charging terminal 43 and the wireless charging station 20 when the two wireless transmitting and receiving panels are opposed to each other at a short distance, whereby the ground wireless charging system and the car wireless charging system can effectively carry out wireless charging.

FIGS. 5 and 6 illustrate a state where the wireless transmitting panel device according to the first preferred embodiment of FIG. 2 is buried in the parking area and the wireless transmitting panel rises. In order to solve the problem of a space for the wireless charging station and not to cause inconvenience in parking general vehicles, the lifting device 76 and a wireless transmitting panel control part 77 of the wireless transmitting panel are buried in the central portion of the parking area, and only the panel receiving frame 71 and the wireless transmitting panel 72-1 located at the top are exposed to the ground surface.

The wireless transmitting panel 72-1 which is exposed to the ground surface and is elevated by the lifting device 76 is received in the inner face of the panel receiving frame 71, so that the wireless transmitting panel 72-1 of the wireless transmitting panel device, which corresponds to the wireless receiving panel of the corresponding electric vehicle, out of the plural wireless transmitting panel devices installed in the parking area rises to the height required according to the charging information by the lifting device 76 and gets ready for wireless power transmission.

The wireless transmitting panel control part 77 buried in the lower end of the wireless transmitting panel controls the lifting device 76 according to the charging information. In the case that the wireless transmitting panel 72-1 has the electromagnetic induction coil, a variable capacitor is mounted to control the lifting device 76 for inductance and resonance of the coil. Alternatively, in the case that the wireless transmitting panel 72-1 has the microwave antenna, a microwave generator and a frequency matching device are mounted to control the lifting device 76. The above functions to keep the optimum matching state for wireless power transmission are contained in the wireless transmitting panel control part 77.

FIG. 7 illustrates a state where the wireless receiving panel according to the first preferred embodiment of FIG. 3 lowers. It is preferable that the wireless receiving panel devices are installed in a room space of the lower part of the electric vehicle as many as possible in order to wirelessly receive a great deal of electric power within a short period of time.

As shown in FIG. 7, in the wireless receiving panel device, the panel receiving frame 71 is closely mounted to a mounting face 78 of the lower part of the electric vehicle not to cause interference in running of the vehicle, and the wireless receiving panel 72-2 is received inside the panel receiving frame 71. The lifting device 76 is operated by the control of the wireless power receiving device 40, which receives the information of the ground wireless transmitting panel device 23 rising according to the charging information communicated through the short-distance wireless communication network, such that the wireless receiving panel 72-2 lowers.

It is preferable that the panel receiving frame 71 and the wireless receiving panel 72-2 are firmly manufactured not to be damaged by obstacles on the ground while the vehicle runs. It is also preferable that accessory devices for the matched state between the ground wireless transmitting panel and the car wireless transmitting panel are integrated to the wireless power receiver mounted inside the vehicle and are controlled to make the thickness of the wireless power receiving panel thin so as to reduce friction with the ground surface.

FIG. 8 is a view showing a state where a plurality of the wireless transmitting panels according to the second preferred embodiment are moved by a panel carrier, FIG. 9 is a view showing a state where a plurality of the wireless receiving panels mounted on the lower part of the electric vehicle according to the second preferred embodiment are aligned, and FIG. 10 is a view showing a state where the wireless transmitting panels of FIG. 8 rise to the two-stage height.

As shown in FIGS. 8 to 10, in the wireless charging system for electric vehicle according to the second preferred embodiment of the present invention, a temporarily tire-stopping device 11, a plurality of the panel carriers 18 respectively having a plurality of back-and-forth movable tracks 16 and laterally movable tracks 17, a ground short-distance wireless communication module 13 and a wireless power transmitting device 22 having a plurality of wireless transmitting panel devices 23-1 to 23-4 are installed in the parking area 10, and in response to the above, a car short-distance wireless communication module 14 and a plurality of wireless receiving panel devices 41-1 to 41-4 are installed on the lower part of the electric vehicle 30.

Out of the parts shown in the block diagram of the wireless charging system for electric vehicles of FIG. 1, parts, which are not illustrated in FIG. 2 but described in the followings, are hidden under the ground in the parking area or by a parking strip or located at remote places, and parts, which are not illustrated in FIG. 8, are installed inside the electric vehicle and not exposed out, and hence, the parts are not illustrated in FIG. 9.

Referring to FIGS. 8 to 10, the wireless charging system for electric vehicles according to the second preferred embodiment of the present invention will be described in detail. When the electric vehicle 30 having four wireless receiving panel devices 41-1 to 41-4 mounted on the lower part of the vehicle enters the parking area 10 and the front wheels of the vehicle stop at the temporarily tire-stopping device 11, the sensor is operated by pressure of the front wheels and the ground short-distance wireless communication module 13 and the wireless power transmitting device 22 connected to the sensor are operated. The wireless transmitting panel devices 23-1 to 23-4 connected thereto get ready for wireless charging. After that, the car short-distance wireless communication module 14 operated by the wireless charging terminal 43 communicates with the ground short-distance wireless communication module 13, and the wireless power receiving device 40 mounted in the vehicle is operated by the charging information of the electric vehicle provided by the communication between the communication modules 13 and 14, so that the wireless receiving panel devices 41-1 to 41-4 get ready for wireless receiving.

Continuously, based on the charging information communicated between the short-distance wireless communication modules 13 and 14, the panel carriers 18 respectively having the wireless transmitting panel devices 23-1 to 23-4 are moved back and forth along the back-and-forth movable track 16 in such a way as to be suitable for the positions of the wireless receiving panel devices 41-1 to 41-4 mounted on the lower part of the electric vehicle, and the wireless transmitting panel devices 23-1 to 23-4 are respectively moved laterally along the laterally movable tracks 17 on the upper end of the panel carrier 18 to the position where the wireless transmitting and receiving panels are opposed to each other, and then, vertically rise by the lifting device as shown in FIG. 10. After that, the wireless transmitting panel devices 23-1 to 23-4 operate the proximity sensors disposed on the wireless receiving panels of the wireless receiving panel devices 41-1 to 41-4, which are opposed to the wireless transmitting panel devices 23-1 to 23-4 at a short distance, and then, communicate with the electronic tags.

Next, information of available wireless charging of the wireless receiving panel devices 41-1 to 41-4 is shown as an available charging menu on the wireless charging terminal 43 mounted on the driver's seat according to the information of the opposed state by the proximity sensors and the electronic tags. When the driver selects the menu of the wireless receiving panel devices 41-1, 41-2 and 41-3, which is expected to provide a high transmission efficiency, the selected menu is provided to the wireless charging station 20 by the short-distance wireless communication module 14 connected to the wireless charging terminal 43, and thereby, when the power control device 21 of the wireless charging station 20 obtains approval of charging, three wireless transmitting panel devices 23-1, 23-3 and 23-4 are operated and wirelessly receive the supplied power. After that, three wireless receiving panel devices 41-1, 41-2 and 41-3 opposed to the three wireless transmitting panel devices at the short distance wirelessly receive the power and electric power received through the wireless power receiver 42, combine the electric powers as one power supply and convert into charging electricity, and then, the charging electricity is charged to the batter 45 of the electric vehicle at high speed through the charging controller 44.

FIG. 10 illustrates a state where the wireless transmitting panels according to the second preferred embodiment of FIG. 8 rise to the two-stage height. A first lifting device 76 disposed on the panel carrier 18, which is movable along the tracks, lifts up the panel receiving frame 71, and the wireless transmitting panel 72-1 rises by a second lifting device 76 supported by the panel receiving frame 71. The reasons to save a vertical space of multi-layered parking strips, on which the wireless charging system according to the present invention is installed, in the parking area because the wireless transmitting panel devices are manufactured thin.

The wireless charging system according to the second preferred embodiment of the present invention carries out wireless charging in the same charging method as the flow chart illustrated in FIG. 14. Excepting the process that the wireless transmitting panels are moved by the panel carrier 18 and are opposed to the wireless receiving panels of the electric vehicle, the second preferred embodiment is the same in wireless charging as the first preferred embodiment illustrated in FIGS. 2 to 7, and hence, its detailed description will be omitted.

As described above, in the drawings of the first and second preferred embodiments, for convenience in indication and description, numbers of the aligned wireless transmitting panels and wireless receiving panels are limited. Accordingly, the plural ground wireless transmitting panel devices and the plural car wireless receiving panel devices are aligned in various ways according to areas and installation conditions of the parking areas and the parking strips, sizes of electric vehicles, charging capacity of the battery, and charging conditions, and hence, the wireless charging system can be constructed efficiently without regard to kinds of vehicles.

FIG. 11 is a block diagram showing the structure of the wireless charging station operated using compound electricity.

As shown in FIG. 11, the wireless charging station for electric vehicles includes a ground wireless charging system having a power control device 21, a compound electricity charging controller 50, a solar-light power generator 52, a wind power generator 53, a fuel cell device 54, a battery device 51 for storing electric power, a wireless power transmitting device 22, and a broad wireless communication network 15.

The wireless charging station, to which the wireless charging system illustrated in FIG. 11 is applied, is a system enabling unmanned operation by a remote control through a broad wireless network, and hence, is fit to backwoods or desert regions where common electric wires cannot be connected. Electric power generated from the solar-light power generator 52, when the wind power generator 53 and the fuel cell device 54 is supplied to the compound electricity charging controller 50 controlled by the power control device 21, the electric power is charged in the battery device 51 for storing electric power, and then, when the electric vehicle enters the parking area for charging, wireless charging is carried out through the above charging procedures. The charging process of the wireless charging system shown in FIG. 11 is the same as the above contents described on the basis of the charging method shown in FIG. 13, and hence, its detailed description will be omitted.

FIG. 12 is a block diagram showing a structure of charging menus displayed on the screen of the wireless charging terminal. Because the wireless charging terminal 43 has the broad wireless communication network module 55 and a GPS receiving module 56 embedded therein, the navigation function and real-time information of the wireless charging stations at the corresponding region are displayed on the position information indicator 66. As charging menus, a charged amount of the battery is displayed on the battery charging condition indicator 61, selection information, in which the matching information of at least one wireless receiving panel capable of wireless charging is indicated in ratio, is displayed on the panel matching information indicator 62, an estimated time of completion of charging is displayed on an estimated time displaying part 63 when a charging method is selected, and a menu for electronic payment is displayed on an electronic payment menu indicator 65 on a touch screen. Because the driver manipulates the charging menus while looking at the wireless charging terminal 43, the wireless charging procedures are carried out conveniently and efficiently.

FIG. 13 is a flow chart showing a wireless charging method according to the first preferred embodiment of the present invention.

Referring to FIG. 13, the wireless charging method of the wireless charging system for electric vehicles according to the present invention will be described in detail. The wireless charging method includes the steps of: generating information of proximity sensors from the tire stopping device when an electric vehicle stops at the parking area; operating the wireless power transmitting device and the ground short-distance wireless communication module based on the information of the proximity sensors; operating the car short-distance wireless communication module through wireless communication with the ground short-distance wireless communication module and wirelessly transmitting charging information of the electric vehicle to the wireless power transmitting device and the wireless charging station; operating the wireless charging terminal disposed on the driver's seat through the car short-distance wireless communication module; selecting and vertically ascending the panel suitable for wireless power transmission out of the plural wireless transmitting panels connected to the wireless power transmitting device according to the charging information of the electric vehicle; operating the wireless power receiving device of the electric vehicle by the operation of the wireless charging terminal; vertically lowering the panel corresponding to the wireless transmitting panel, which is vertically ascended, out of the wireless receiving panels mounted on the lower part of the electric vehicle according to the control of the wireless power receiving device; recognizing the proximity sensors and the electronic tags disposed on each panel when the wireless transmitting panel and the wireless receiving panel are lifted up; matching impedances or microwave frequencies of the electromagnetic coils of the wireless transmitting panel and the wireless receiving panel to achieve optimized wireless transmission and reception by transmitting communication information of the proximity sensors and the electronic tags to the wireless power transmitting device and the wireless power receiving device; displaying the charging menus on the wireless charging terminal; selecting the charging menu on the wireless charging terminal by the driver's manipulation; transmitting the driver's selection information to the wireless charging station through communication between the car short-distance wireless communication module and the ground short-distance wireless communication module; based on the driver's selection information, respectively supplying electric power to the plural wireless transmitting panels selected by a control of the wireless power transmitting device connected to the wireless charging station; based on the driver's section information, receiving wireless electric power to the corresponding wireless receiving panels selected by a control of the wireless power receiver; combining all electric power wirelessly received through the plural wireless receiving panels through the wireless power receiver and charging the battery of the electric vehicle through the charging controller; displaying information on completion of charging on the wireless charging terminal when charging is finished; allowing the driver to do electronic payment of charging fees through the wireless charging terminal; and initializing the wireless charging system when the electronic payment is finished.

FIG. 14 is a flow chart showing a wireless charging method according to the second preferred embodiment of the present invention.

Referring to FIG. 14, another wireless charging method of the wireless charging system for electric vehicles according to the present invention will be described in detail by steps. The wireless charging method includes the steps of: generating information of proximity sensors from the temporarily tire-stopping device when an electric vehicle stops at the parking area; operating the wireless power transmitting device and the ground short-distance wireless communication module based on the information of the proximity sensors; operating the car short-distance wireless communication module through wireless communication with the ground short-distance wireless communication module and wirelessly transmitting charging information of the electric vehicle to the wireless power transmitting device and the wireless charging station; operating the wireless charging terminal disposed on the driver's seat through the car short-distance wireless communication module; based on the charging information of the electric vehicle, moving a panel carrier, which is suitable for wireless power transmission and reception, out of a plurality of panel carriers in all directions to the plural wireless receiving panels mounted on the lower end of the electric vehicle according to a control of the wireless power transmitting device; vertically lifting each of the wireless transmitting panels mounted on the plural panel carriers selected and moved; operating the wireless power receiving device of the electric vehicle by the operation of the wireless charging terminal; vertically lowering the panel corresponding to the wireless transmitting panel, which is vertically ascended, out of the wireless receiving panels mounted on the lower part of the electric vehicle according to the control of the wireless power receiving device; recognizing the proximity sensors and the electronic tags disposed on each panel when the wireless transmitting panel and the wireless receiving panel are lifted up; matching impedances or microwave frequencies of the electromagnetic coils of the wireless transmitting panel and the wireless receiving panel to achieve optimized wireless transmission and reception by transmitting communication information of the proximity sensors and the electronic tags to the wireless power transmitting device and the wireless power receiving device; displaying the charging menus on the wireless charging terminal; selecting the charging menu on the wireless charging terminal by the driver's manipulation; transmitting the driver's selection information to the wireless charging station through communication between the car short-distance wireless communication module and the ground short-distance wireless communication module; based on the driver's selection information, respectively supplying electric power to the plural wireless transmitting panels selected by a control of the wireless power transmitting device connected to the wireless charging station; based on the driver's section information, receiving wireless electric power to the corresponding wireless receiving panels selected by a control of the wireless power receiver; combining all electric power wirelessly received through the plural wireless receiving panels through the wireless power receiver and charging the battery of the electric vehicle through the charging controller; displaying information on completion of charging on the wireless charging terminal when charging is finished; allowing the driver to do electronic payment of charging fees through the wireless charging terminal; and initializing the wireless charging system when the electronic payment is finished.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The present invention relates to the wireless charging system for electric vehicles, which is useful to construct a charging infrastructure required for spread of electric vehicles. In the case that the wireless charging system for electric vehicles according to the present invention is installed in general parking areas or at waysides, the wireless charging system can contribute to spread of electric vehicles because it can charge electric vehicles within a short period of time in a non-contact and wireless manner.

Moreover, the wireless charging system for electric vehicles according to the present invention allows the wireless charging stations to be easily constructed anywhere without any restriction in installation space because it simplifies charging facilities by the wireless method. Furthermore, the wireless charging system allows the charging infrastructure of the electric vehicles to be widely constructed because it can be remotely operated by the broad wireless communication network and the wireless charging stations can be constructed even in backwoods, where common electric wires cannot be connected, through power generated from solar light and wind power.

What is claimed is:

1. A wireless charging system for electric vehicles comprising:
    a power control device mounted in a wireless charging station for controlling each of wireless power transmitting devices;
    at least one wireless power transmitting device connected to the power control device and mounted in a parking area;
    a ground short-distance wireless communication module connected to the wireless power transmitting device and mounted in the parking area;
    a plurality of wireless transmitting panel devices installed on the ground of the parking area, each of the wireless transmitting panel devices having a wireless charging panel and being operated in such a fashion that only the wireless transmitting panel device selected according to kinds of the corresponding vehicle based on charging information of the electric vehicle received through short-distance wireless communication on the ground is operated by the wireless power transmitting device;
    a plurality of wireless receiving panel devices mounted on the lower part of the electric vehicle, each of the wireless receiving panel devices having a wireless receiving panel;
    a wireless power receiver mounted in the electric vehicle for controlling the wireless receiving panel devices;
    a wireless charging terminal connected to the wireless power receiver and mounted on a driver's seat of the electric vehicle, the wireless charging terminal allowing the driver to select the wireless receiving panel device suitable for wireless charging out of the plural wireless receiving panel devices and to input an electronic payment;
    a car short-distance wireless communication module mounted in the electric vehicle and connected to the wireless charging terminal; and
    a charging controller connected to the wireless power receiver for controlling that electric power received from the wireless receiving panel device is charged to a battery of the electric vehicle.

2. The wireless charging system according to claim 1, wherein the wireless transmitting panel of the wireless transmitting panel device and the wireless receiving panel of the wireless receiving panel device respectively have electromagnetic induction coils for short-distance wireless charging.

3. The wireless charging system according to claim 1, wherein the wireless transmitting panel of the wireless transmitting panel device and the wireless receiving panel of the wireless receiving panel device respectively have microwave antennas embedded therein so as to convert electric power into microwaves and transmit the microwaves to the wireless power receiver.

4. The wireless charging system according to claim 1, wherein the ground short-distance wireless communication module and the car short-distance wireless communication module respectively have at least one proximity sensor and at least one electronic RFID (Radio Frequency Identification) tag.

5. The wireless charging system according to claim 1, further comprising:
    a plurality of movable tracks for carrying the wireless transmitting panel devices; and
    a plurality of panel carriers for selectively moving only the wireless transmitting panel device, which corresponds to the wireless receiving panel device mounted in the electric vehicle, on the movable tracks in various directions by a control of the wireless power transmitting device based on charging information received from the electric vehicle.

6. The wireless charging system according to claim 5, wherein the panel carrier comprises a lifting device for elevating the wireless transmitting panel device.

7. The wireless charging system according to claim 1, wherein the wireless transmitting panel device comprises a lifting device for elevating the wireless transmitting panel by a control of the wireless power transmitting device.

8. The wireless charging system according to claim 1, wherein the wireless receiving panel device comprises a lifting device for elevating the wireless receiving panel by a control of the wireless power receiver.

9. The wireless charging system according to claim 1, wherein the wireless transmitting panel of the wireless transmitting panel device and the wireless receiving panel of the wireless receiving panel device respectively have at least one proximity sensor and at least one electronic RFID tag.

10. The wireless charging system according to claim 1, further comprising:
    a temporarily tire-stopping device installed in the parking area and having a sensor in such a fashion that the wireless power transmitting device and the ground short-distance wireless communication module are operated by a signal sensing the stop of the electric vehicle.

11. The wireless charging system according to claim 1, wherein the wireless transmitting panel device and the wireless receiving panel device respectively have a matching function to optimize electromagnetic induction and matching of microwave frequencies.

12. The wireless charging system according to claim 1, wherein the wireless charging terminal displays charging menus of the electric vehicle, such as battery charging state, selection information indicating an opposed state between the wireless transmitting panels and the wireless receiving panels capable of wireless charging into a matching ratio, an expected charging period of time when the selection information is selected, the progress of charging, and means for electronic payment, on a touch screen and the charging menus are manipulated by a driver's touch.

13. The wireless charging system according to claim 1, wherein the wireless charging terminal comprises a broad wireless communication network module and a GPS receiving module embedded therein, such that a navigation function and position guide information of wireless charging stations in a region where the electric vehicle runs are automatically displayed on the screen in real time.

14. The wireless charging system according to claim 1, wherein a broad wireless communication network and a compound electricity charging controller are connected to the power control device, a battery device for storing electric power is connected to the compound electricity charging controller, and at least one of a solar-light power generator, a wind power generator and a fuel cell device is connected to the compound electricity charging controller, such that electric power supplied from the solar-light power generator, the wind power generator or the fuel cell device is charged to the battery device through the compound electricity charging controller, and when the electric vehicle enters the parking area for charging, the wireless charging system carries out wireless charging at high speed according to the charging information communicated between the ground wireless charging system and the car wireless charging system.

15. A charging method of a wireless charging system for electric vehicle comprising the steps of:
generating information of proximity sensors from the tire stopping device when an electric vehicle stops at the parking area; operating the wireless power transmitting device and the ground short-distance wireless communication module based on the information of the proximity sensors; operating the car short-distance wireless communication module through wireless communication with the ground short-distance wireless communication module and wirelessly transmitting charging information of the electric vehicle to the wireless power transmitting device and the wireless charging station; operating the wireless charging terminal disposed on the driver's seat through the car short-distance wireless communication module; selecting and vertically ascending the panel suitable for wireless power transmission out of the plural wireless transmitting panels connected to the wireless power transmitting device according to the charging information of the electric vehicle; operating the wireless power receiving device of the electric vehicle by the operation of the wireless charging terminal; vertically lowering the panel corresponding to the wireless transmitting panel, which is vertically ascended, out of the wireless receiving panels mounted on the lower part of the electric vehicle according to the control of the wireless power receiving device; recognizing the proximity sensors and the electronic tags disposed on each panel when the wireless transmitting panel and the wireless receiving panel are lifted up; matching impedances or microwave frequencies of the electromagnetic coils of the wireless transmitting panel and the wireless receiving panel to achieve optimized wireless transmission and reception by transmitting communication information of the proximity sensors and the electronic tags to the wireless power transmitting device and the wireless power receiving device; displaying the charging menus on the wireless charging terminal; selecting the charging menu on the wireless charging terminal by the driver's manipulation; transmitting the driver's selection information to the wireless charging station through communication between the car short-distance wireless communication module and the ground short-distance wireless communication module; based on the driver's selection information, respectively supplying electric power to the plural wireless transmitting panels selected by a control of the wireless power transmitting device connected to the wireless charging station; based on the driver's section information, receiving wireless electric power to the corresponding wireless receiving panels selected by a control of the wireless power receiver; combining all electric power wirelessly received through the plural wireless receiving panels through the wireless power receiver and charging the battery of the electric vehicle through the charging controller; displaying information on completion of charging on the wireless charging terminal when charging is finished; allowing the driver to do electronic payment of charging fees through the wireless charging terminal; and initializing the wireless charging system when the electronic payment is finished.

16. A charging method of a wireless charging system for electric vehicle comprising the steps of:
Generating information of proximity sensors from the temporarily tire-stopping device when an electric vehicle stops at the parking area; operating the wireless power transmitting device and the ground short-distance wireless communication module based on the information of the proximity sensors; operating the car short-distance wireless communication module through wireless communication with the ground short-distance wireless communication module and wirelessly transmitting charging information of the electric vehicle to the wireless power transmitting device and the wireless charging station; operating the wireless charging terminal disposed on the driver's seat through the car short-distance wireless communication module; based on the charging information of the electric vehicle, moving a panel carrier, which is suitable for wireless power transmission and reception, out of a plurality of panel carriers in all directions to the plural wireless receiving panels mounted on the lower end of the electric vehicle according to a control of the wireless power transmitting device; vertically lifting each of the wireless transmitting panels mounted on the plural panel carriers selected and moved; operating the wireless power receiving device of the electric vehicle by the operation of the wireless charging terminal; vertically lowering the panel corresponding to the wireless transmitting panel, which is vertically ascended, out of the wireless receiving panels mounted on the lower part of the electric vehicle according to the control of the wireless power receiving device; recognizing the proximity sensors and the electronic tags disposed on each panel when the wireless transmitting panel and the wireless receiving panel are lifted up; matching impedances or microwave frequencies of the electromagnetic coils of the wireless transmitting panel and the wireless receiving panel to achieve optimized wireless transmission and reception by transmitting communication information of the proximity sensors and the electronic tags to the wireless power transmitting device and the wireless power receiving device; displaying the charging menus on the wireless charging terminal; selecting the charging menu on the wireless charging terminal by the driver's manipulation; transmitting the driver's selection information to the wireless charging station through communication between the car short-distance wireless communication module and the ground short-distance wireless communication module; based on the driver's selection information, respectively supplying electric power to the plural wireless transmitting panels selected by a control of the wireless power transmitting device connected to the wireless charging station; based on the driver's section information, receiving wireless electric power to the corresponding wireless receiving panels selected by a control of the wireless power receiver; combining all electric power wirelessly received through the plural wireless receiving panels through the wireless power receiver and charging the battery of the electric vehicle through the charging controller; displaying information on completion of charging on the wireless charging terminal when charging is finished; allowing the driver to do electronic payment of charging fees through the wireless charging terminal; and initializing the wireless charging system when the electronic payment is finished.

* * * * *